(12) United States Patent
Purusothaman et al.

(10) Patent No.: US 9,503,449 B1
(45) Date of Patent: Nov. 22, 2016

(54) APPLICATION CENTRIC CENTRALIZED CERTIFICATE MANAGEMENT SYSTEM FOR MANAGING CERTIFICATES ACROSS DATA CENTERS

(71) Applicant: Payoda Inc., Plano, TX (US)

(72) Inventors: Anand Purusothaman, Jersey, NJ (US); Murali Palanisamy, Jersey, NJ (US)

(*) Notice: Subject to any disclaimer, the term of this patent is extended or adjusted under 35 U.S.C. 154(b) by 55 days.

(21) Appl. No.: 14/710,179

(22) Filed: May 12, 2015

(51) Int. Cl.
H04L 29/06 (2006.01)

(52) U.S. Cl.
CPC .......... H04L 63/0823 (2013.01); H04L 63/20 (2013.01)

(58) Field of Classification Search
CPC .............................. H04L 9/08; H04L 9/3263
See application file for complete search history.

(56) References Cited

U.S. PATENT DOCUMENTS

| | | | | |
|---|---|---|---|---|
| 2009/0113543 A1* | 4/2009 | Adams | ............... | G06F 21/33 726/18 |
| 2010/0257358 A1* | 10/2010 | Grajek | ............... | H04L 9/3263 713/158 |
| 2013/0346745 A1* | 12/2013 | Broch | ............... | H04L 9/3263 713/156 |
| 2015/0222604 A1* | 8/2015 | Ylonen | ............... | H04L 63/062 713/171 |

* cited by examiner

Primary Examiner — Izunna Okeke
(74) Attorney, Agent, or Firm — The Law Office of Austin Bonderer, PC; Austin Bonderer

(57) ABSTRACT

A system for managing one or more certificates on granular object level in one or more datacenters is provided. The system includes a discover module, an inventory module, a work order module, and a policy module. The discover module is configured to discover the one or more certificates. The inventory module is configured to provide details of the one or more certificates. The work order module is configured to store details of (i) a work order id of the one or more certificates, (ii) device information of the one or more certificates, (iii) a time stamp of implementation of the one or more certificates, and (iv) a status the one or more certificates. The policy module is configured to create a policy that specifies (i) usage of the one or more certificates, and (ii) practices that a certificate authority (CA) employs to manage the one or more certificates.

13 Claims, 13 Drawing Sheets

|          |        | Admin | Logout |
|----------|--------|-------|--------|

Dashboard — Certificate Management

Ctrl Center | Discover | Inventory | New Cert | Workorder | Policy | Cert Group | Validation | Settings

AppViewX CA

| Common Name | AppViewX Intermediate CA | Algorithm | RSA |
|---|---|---|---|
| Organization Unit | | Key Length | 1024 |
| Organization | | Validity | |
| Locality | Plano | Start Date | 28/04/2015 |
| State or Province | Texas | End Date | 26/04/2020 |
| Country | US | E-mail Address | |

Save   Cancel

Microsoft CA

Geotrust CA

Verisign CA

Entrust CA

APPLICATION CENTRIC CENTRALIZED CERTIFICATE MANAGEMENT SYSTEM FOR MANAGING CERTIFICATES ACROSS DATA CENTERS

BACKGROUND

Technical Field

The embodiments herein generally relate a certificate management system, and more particularly, to a system and method for managing certificates across data centers.

Description of the Related Art

Application delivery and certificate management in networks is critical for application owners and network administrators. Existing legacy tools are not supported by development teams, as there are multiple different tools with each of them running on independent scripts. Collaboration among the tools is essential for the efficient functioning of the system. Existing applications are also independent of each another with access restricted to concerned independent teams. Thus, an unreasonable amount of time and resources are spent on writing scripts every time a team needs to monitor applications outside its scope of access. Also there is no single-view visibility of an application to manage certificates across networking components running across multiple data centers.

Device level operations on management tools makes routing traffic amongst data centers difficult and unnecessarily complex. This also amplifies the risk of errors and difficulties in setting up and altering rules to serve traffic. Monitoring applications, studying statistics, managing certificates and gauging the health of applications are highly complex in existing systems. An increased number of independent tools render migration/upgrading of network tools almost impossible. Also, fixing issues consumes time, which is very critical in industries like banking, healthcare, etc., where data management is critical.

The most common solutions for application delivery and certificate management are provided by device vendors themselves. However, these solutions monitor the certificates and give a device-centric view of the network, which does not meet the requirements of application owners, network administrators, and CXOs to monitor network components.

Accordingly, there is a need for an application centric centralized system to manage one or more certificates across data centers.

SUMMARY

In view of the foregoing, an embodiment herein provides an application centric centralized certificate management system for managing one or more certificates on granular object level in one or more datacenters. The application centric centralized certificate management system includes a memory unit, a display unit and a processor. The memory unit stores a database and a set of modules. The processor executes the set of modules. The processor may be a hardware processor. The set of modules includes a discover module, an inventory module, a work order module, and a policy module. The discover module, executed by the processor, is configured to discover the one or more certificates across the one or more datacenters. The inventory module, executed by the processor, is configured to provide details of the one or more certificates. The work order module, executed by the processor, is configured to store details of (i) a work order id of the one or more certificates, (ii) a device information of the one or more certificates, (iii) a time stamp of implementation of the one or more certificates, and (iv) a status of the one or more certificates. The policy module, executed by the processor, is configured to create a policy that specifies (i) an usage of the one or more certificates, and (ii) practices that a certificate authority (CA) employs to manage the one or more certificates. The display unit displays a holistic view of the one or more certificates to perform one or more actions on granular object level.

In one embodiment, the application centric centralized certificate management system further includes a new certificate module, and a validation module. The new certificate module, executed by the processor, is configured to create a new certificate for the application centric centralized certificate management system. The validation module, executed by the processor, is configured to validate (a) the new certificate when the new certificate is added to the application centric centralized certificate management system, and (b) the one or more certificates. In another embodiment, the application centric centralized certificate management system includes a certificate group module, and a settings module. The certificate group module, executed by the processor, is configured to create a certificate group for the one or more certificates. The settings module, executed by said processor, is configured to manage authentication details to initiate a secured connection with a CA to perform one or more actions on the one or more certificates. In yet another embodiment, the inventory module is further configured provide an option to associate the one or more certificates to the certificate group. In yet another embodiment, the policy is applied to the one or more certificates on granular object level by associating the policy to the certificate group. In yet another embodiment, the policy module is configured to perform a compliance check against the one or more certificates based on the policy to generate compliance reports for the one or more certificates. In yet another embodiment, the discover module is configured to discover the one or more certificates based on at least one of (i) an IP range, (ii) a subnet, (iii) an URL, (iv) by uploading a certificate, and (v) managed devices. In yet another embodiment, the policy module is configured to perform at least one action. The at least one action is selected from a group includes (a) providing access control to the one or more certificates, (b) a policy enforcement on the one or more certificates, and (c) a compliance check on the one or more certificates. In yet another embodiment, the new certificate module is configured to provide an option to select a connector type for creating the new certificate.

In another aspect, a non-transitory program storage device readable by computer, and includes a program of instructions executable by the computer to perform a method for managing one or more certificates on granular object level in one or more application specific networking components across one or more data centers is provided. The method includes following steps: (i) discovering one or more certificates in the application centric centralized certificate management system; (ii) providing details of the one or more certificates; (iii) storing the details of (a) a work order id, (b) a device information, (c) a time stamp of implementation, and (d) a status of the one or more certificates; (iv) creating a policy for the one or more certificates; (v) creating a group to categorize the one or more certificates; (vi) managing authentication details to initiate a secured connection with a CA to perform one or more actions on the one or more certificates; (vii) creating a new certificate; and (viii) validating (a) new certificate when the new certificate is added to the application centric centralized certificate management system, and (b) the one or more certificates. In one embodiment, the method further includes the step of displaying a holistic view of the one or more certificates to perform one or more actions on granular object level. In another embodiment, the policy is applied to the one or more certificates on granular object level by associating the policy to the certificate group. In yet another embodiment, the method further includes the step of performing a compliance check against the one or more certificates based on the policy to generate compliance reports for the one or more certificates.

In yet another aspect, a computer implemented method for managing one or more certificates on granular object level in one or more application specific networking components across one or more data centers using an application centric centralized certificate management system is provided. The method includes following steps: (i) discovering one or more certificates in the application centric centralized certificate management system; (ii) providing details of the one or more certificates; (iii) storing the details of (a) a work order id, (b) a device information, (c) a time stamp of implementation, and (d) a status of the one or more certificates; (iv) creating a policy for the one or more certificates; (v) creating a group to categorize the one or more certificates; (vi) managing authentication details to initiate a secured connection with a CA to perform one or more actions on the one or more certificates; (vii) creating a new certificate; and (viii) validating (a) the new certificate when the new certificate is added to the application centric centralized certificate management system, and (b) the one or more certificates us. In one embodiment, the method further includes the step of displaying a holistic view of the one or more certificates to perform one or more actions on granular object level. In another embodiment, the policy is applied to the one or more certificates on granular object level by associating the policy to the certificate group. In yet another embodiment, the method further includes the step of performing a compliance check against the one or more certificates based on the policy to generate compliance reports for the one or more certificates.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 illustrates a user interface view of an inventory module of FIG. 3 according to an embodiment herein;

FIG. 7A illustrates a user interface view of a policy module of FIG. 3 according to an embodiment herein;

FIGS. 7B and 7C illustrate user interface views of a settings module of FIG. 3 according to an embodiment herein;

DETAILED DESCRIPTION OF PREFERRED EMBODIMENTS

Figure 1:
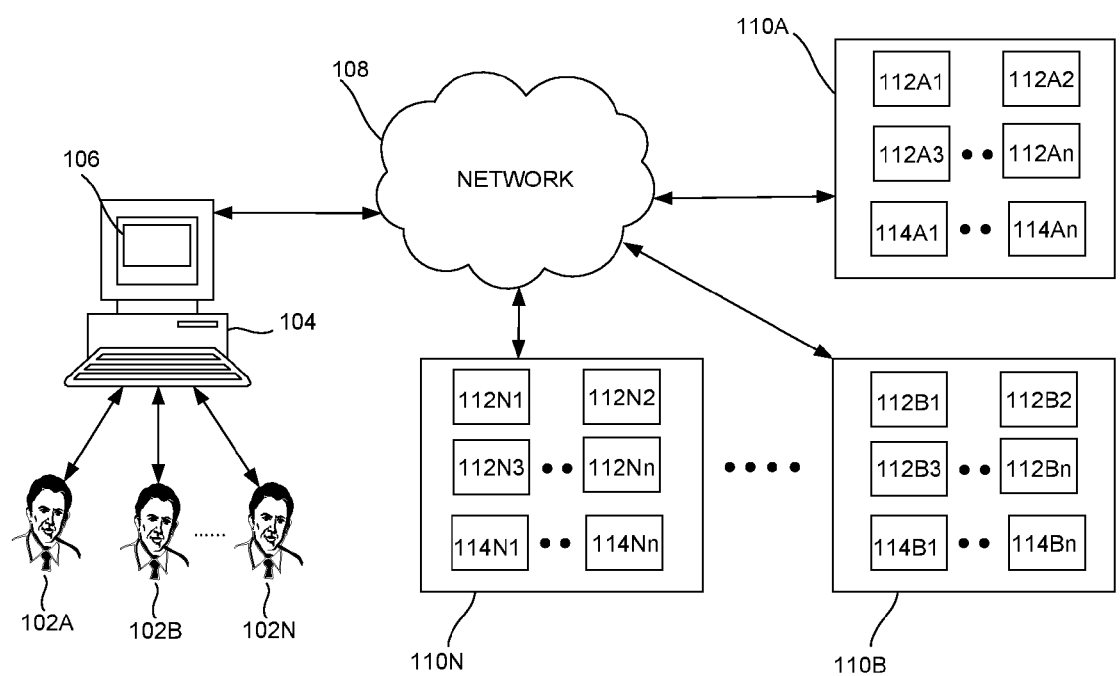
FIG. 1 illustrates a system view of one or more users communicating with a user system to manage one or more certificates using an application centric centralized certificate management system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide an application centric centralized certificate management system that manages one or more certificates on granular object level across datacenters. The application centric centralized certificate management system performs various actions on the one or more certificates on granular object level, such as, discovering certificates, issuing certificates, ordering certificates, renewing certificates, pushing certificates, automatic renewal/pushing of the certificates, and compliance reporting of the certificates. Referring now to the drawings, and more particularly to FIGS. 1 through 10, where similar reference characters denote corresponding features consistently throughout the figures, there are shown preferred embodiments.

FIG. 1 illustrates a system view 100 of one or more users 102A-N communicating with a user system 104 to manage one or more certificates of one or more Application Specific Networking Components (ASNC) 112A1-Nn operating in one or more datacenters 110A-N on granular object level using an application centric centralized certificate management system 106 according to an embodiment herein. The application centric centralized certificate management system 106 provides a user interface to the one or more users 102A-N to manage the one or more certificates of the ASNC's 112A1-Nn operating in the one or more datacenters 110A-N on granular object level. The granular object level may include object attributes for authorized functions, and/or access control for individual object property of a device (i.e. ASNC 112). In one embodiment, the ASNC's 112A1-Nn include a BIG IP device from F5 networks, ACE—Application Control Engine from Cisco, and Net scaler from Citrix etc. The one or more datacenters 110A-N include one or more IP servers 114A1-Nn. In one embodiment, the one or more IP servers 114A1-Nn also called as domain server.

Figure 2:
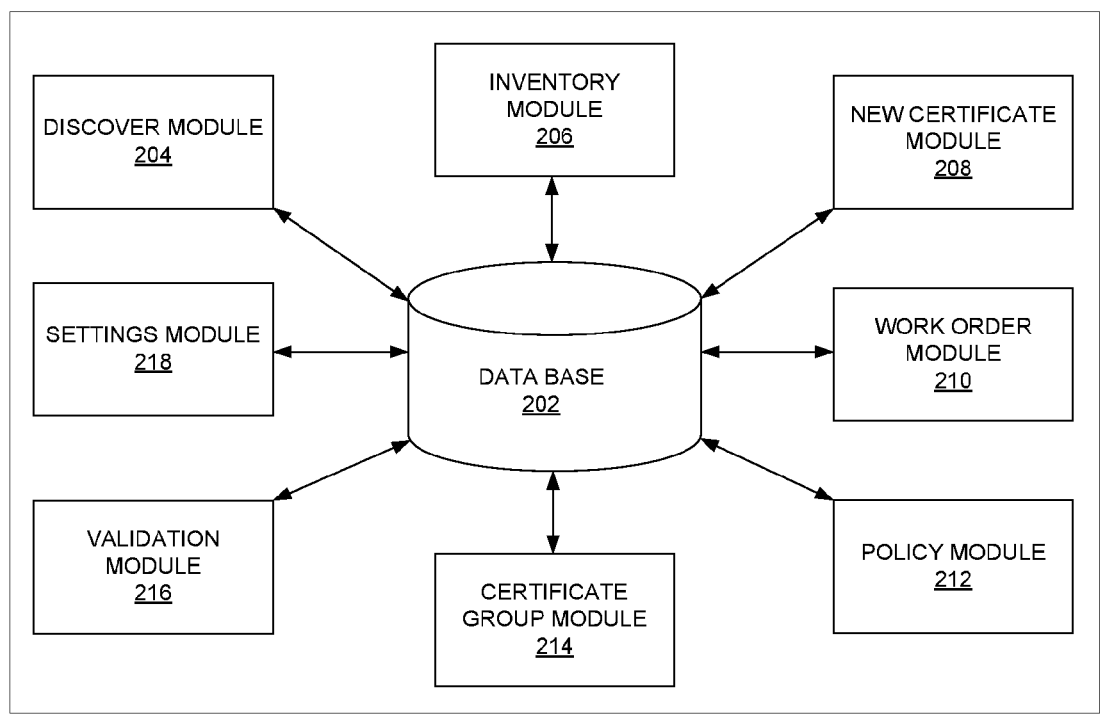
FIG. 2 illustrates an exploded view of the application centric centralized certificate management system of FIG. 1 according to an embodiment herein.

FIG. 2 illustrates an exploded view of the application centric centralized certificate management system 106 of FIG. 1 according to an embodiment herein. The application centric centralized certificate management system 106 includes a database 202, a discover module 204, an inventory module 206, a new certificate module 208, a work order module 210, a policy module 212, a certificate group module 214, a validation module 216, and a settings module 218. The discover module 204 is configured to discover one or more certificates of ASNC's 112A1-Nn. The inventory module 206 is configured to provide details of the one or more certificates such as certificate group of the one or more certificates, a serial number of the one or more certificates, profile of the one or more certificates, a vendor of the one or more certificates, and to which devices the one or more certificates is connected. The inventory module 206 provides a status of the one or more certificates (e.g. a managed certificate, a new certificate). In one embodiment, the inventory module 206 associates the one or more certificates to a certificate group by clicking an associate certificate group field. In order to associate the one or more certificates, the inventory module 206 provides an option to select the one or more certificates which need to be associated. In another embodiment, the inventory module 206 provides a certificate group name, an application id, and selects under which parent group the one or more certificates need to be associated. The new certificate module 208 is configured to create one or more new certificates. The work order module 210 is configured to store details of (i) a work order id, (ii) device information, (iii) a time stamp of implementation, and (iv) a status of the one or more certificates. The policy module 212 creates a policy (i.e. a set of protocols/rules) that specifies (i) the usage of the one or more certificates, and (ii) the practices that a certificate authority (CA) employs to manage the one or more certificates. The policy is applied to the one or more certificates on granular object level by associating the policy to certificate groups that includes common security requirements. The policy module 212 performs a compliance check against the one or more certificates based on the policy, and generate compliance reports. The certificate group module 214 is configured to create a certificate group for the one or more certificates that are selected by the one or more users 102A-N. The validation module 216 is configured to validate (a) the new certificate that is added to the application centric centralized certificate management system 106, and (b) the one or more certificates. In one embodiment, the validation module 216 is configured to validate appropriateness of the one or more certificates that resides within a fully qualified domain name (FQDN), or an internet protocol (IP) address, based on expiration status of the one or more certificates. The settings module 218 is configured to manage authentication details to initiate a secured connection with a CA to perform one or more actions on the one or more certificates.

Figure 3:
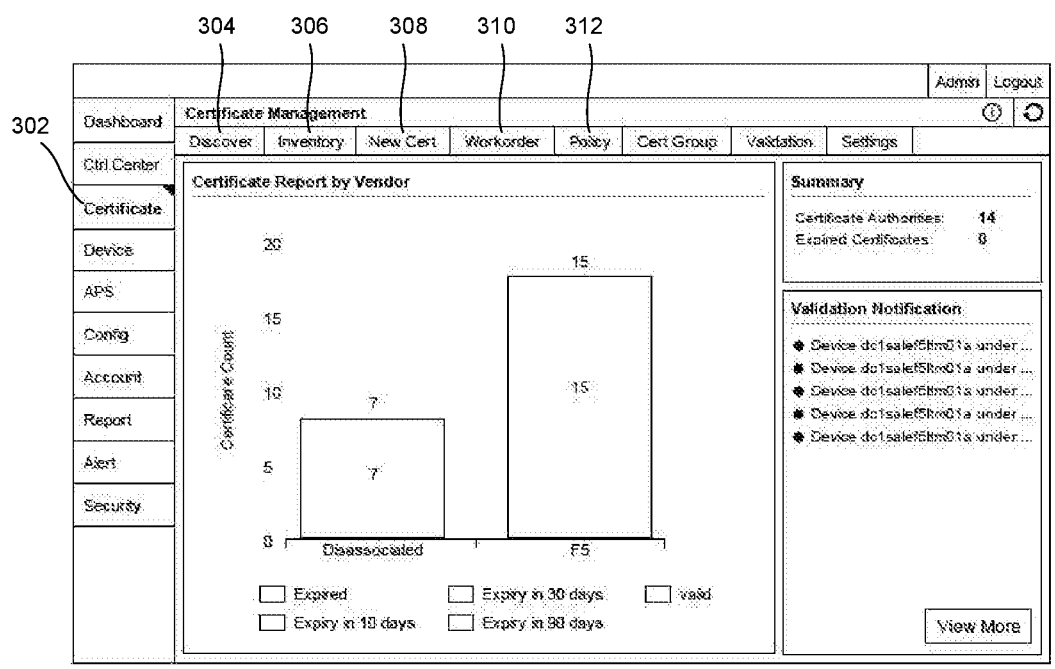
FIG. 3 illustrates a user interface view of the application centric centralized certificate management system of FIG. 1 according to an embodiment herein.

FIG. 3 illustrates a user interface view of the application centric centralized certificate management system 106 of FIG. 1 according to an embodiment herein. The application centric centralized certificate management system 106 includes a certificate tab 302. In one embodiment, the certificate tab 302 displays a certificate report by a vendor. The certificate tab 302 includes a discover tab 304, an inventory tab 306, a new certificate tab 308, a work order tab 310, and a policy tab 312. The discover tab 304 is configured to discover the one or more certificates in various ways in the application centric centralized certificate management system 106 when the one or more users 102A-N select/click the discover tab 304. The inventory tab 306 is configured to provide the details of the one or more certificates such as certificate group of the one or more certificates, a serial number of the one or more certificates, profile of the one or more certificates, a vendor of the one or more certificates, and to which devices the one or more certificates are connected, and provides the status of the certificates (e.g., managed certificate, new certificate). The new certificate tab 308 is configured to create a new certificate when the one or more users 102A-N selects the new certificate tab 308. The work order tab 310 is configured to keep track of all the activities such as a work order id, device information, a time stamp of implementation, and a status of the one or more certificates. The policy tab 312 creates a policy (i.e. a set of protocols/rules that specifies (i) usage of the one or more certificates, and (ii) practices that a certificate authority employs to manage the one or more certificates. The policy is applied to the one or more certificates on granular object level by associating the policy to certificate groups that includes common security requirements. The policy tab 312 performs a compliance check against the one or more certificates based on the policy, and generate compliance reports. In one embodiment, the policy tab 312 performs one or more actions such as providing access control, policy enforcement, and compliance check on the one or more certificates on granular object level. The certificate tab 302 further includes a certificate group tab, a validation tab, and a settings tab. The certificate group tab is configured to create a certificate group for the one or more certificates that are selected by the one or more user's 102A-N. In another embodiment, one or more certificate groups are created as a hierarchical structure with sub-groups nested under the one or more certificate groups. The validation tab is configured to validate (a) the new certificate that is added to the application centric centralized certificate management system 106, (b) the one or more certificates. In one embodiment, the validation tab generates a validation report to check (i) whether the fully qualified domain name (FQDN) of the application centric centralized certificate management system 106 matches the common name of the one or more certificates, and (ii) whether an end entity certificate, and the associated chain certificates of the end entity certificate are correctly installed onto the application centric centralized certificate management system 106. In another embodiment, the validation tab is configured to validate appropriateness of the one or more certificates that resides within a fully qualified domain name (FQDN), or an internet protocol (IP) address, based on expiration status of the one or more certificates. The settings tab is configured to manage authentication details to initiate a secured connection with a CA to perform one or more actions on the one or more certificates. The settings tab is further configured to change/update the information (e.g., a certificate authority name, credentials/respective authorization details, contact details, etc.) related to the one or more certificates in the application centric centralized certificate management system 106.

Figure 4:
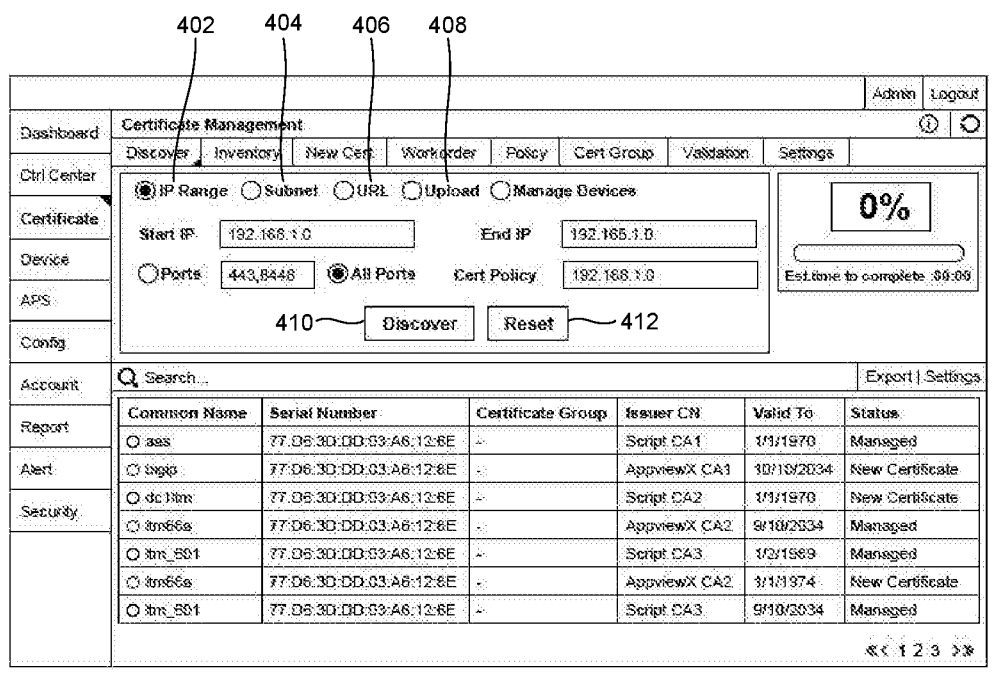
FIG. 4 illustrates a user interface view of a discover module of FIG. 3 according to an embodiment herein.

FIG. 4 illustrates a user interface view of the discover module 204 of FIG. 3 according to an embodiment herein.

The user interface view of the discover module 204 is configured to provide an option to the one or more users 102A-N to discover one or more certificates in the application centric centralized certificate management system 106. The user interface view of the discover module 204 discovers the one or more certificates using following options: (i) an IP range 402, (ii) a subnet 404, (iii) an URL 406, (iv) by uploading the certificate 408, and/or (v) managed devices. The user interface view of the discover module 204 discovers the one or more certificates using the IP range 402 when the one or more users 102A-N select the IP Range 402 to discover the one or more certificates. The one or more users 102A-N enter the start IP and end IP addresses, and click on the discover button 410 to discover the one or more certificates. The reset button 412 is configured to reset/re-enter the start IP and end IP addresses. In one embodiment, the user interface view of the discover module 204 discovers the one or more certificates using the subnet 404 when the one or more users 102A-N selects the subnet 404 to discover the one or more certificates. The one or more users 102A-N enter the network address, and clicks on the discover button 410 to discover the one or more certificates. In another embodiment, the user interface view of the discover module 204 discovers the certificate using the URL 406 when the one or more users 102A-N select the URL 406 to discover the one or more certificates. The one or more users 102A-N enter the URL 406 address, and clicks on discover button 410 to discover the one or more certificates in the application centric centralized certificate management system 106. In yet another embodiment, the user interface view of the discover module 204 discovers the one or more certificates using the upload the certificate 408 when the one or more users 102A-N select the option of uploading the certificate 408 to discover the one or more certificates. The certificates are uploaded on granular object level to the application centric centralized certificate management system 106 using upload the certificate 408 for managing and/or monitoring the one or more certificates. In yet another embodiment, the user interface view of the discover module 204 discovers the one or more certificates using the managed devices when the one or more users 102A-N select the option of managed devices to discover the one or more certificates.

Figure 5:
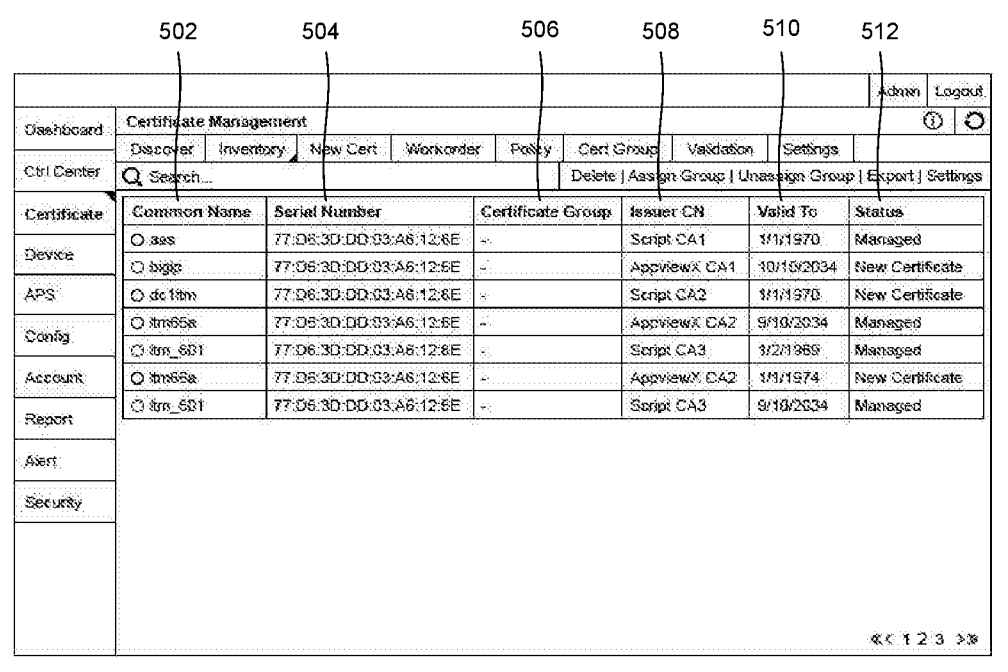

FIG. 5 illustrates a user interface view of the inventory module 206 of FIG. 3 according to an embodiment herein. The user interface view of the inventory module 206 is configured to provide details of the one or more certificates such as a certificate group to which the one or more certificates associated with, a serial number of the one or more certificates, a profile of the one or more certificates, a vendor of the one or more certificates and to which devices the one or more certificates are connected, and a status of the one or more certificates (e.g., a managed certificate, a new certificate). The user interface view of the inventory module 206 includes the details of the one or more certificates such as a common name (CN) of the certificate 502, a serial number of the certificate 504, a certificate group 506, an issuer CN 508, a validity detail 510, and a status 512. The certificate group 506 provides details about a list of certificate groups that are available in the application centric centralized certificate management system 106. In one embodiment, the certificate group 506 is created for the one or more certificates that need to be grouped by selecting/clicking on associate cert group tab (not shown in FIG.). The one or more users 102A-N provide a certificate group name, and an application ID when the one or more users 102A-N create the certificate group 506. In one embodiment, the one or more users 102A-N further select a parent certificate group to which the selected certificate needs to be associated.

Figure 6A:
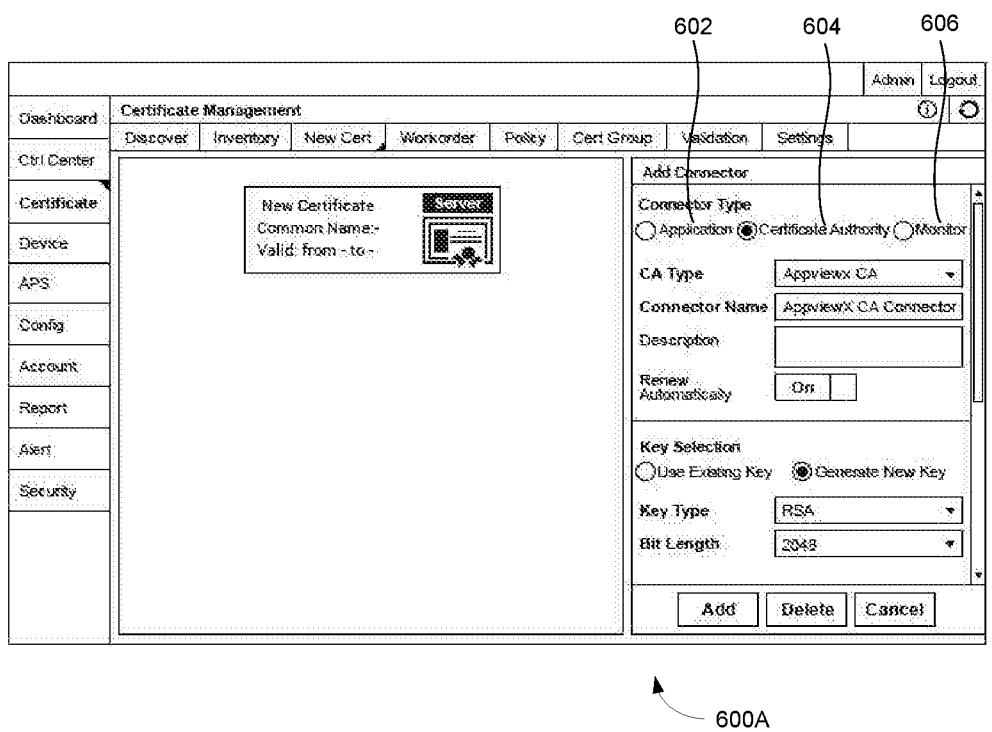
FIG. 6A illustrates a user interface view of a new certificate module of FIG. 3 according to an embodiment herein.

FIG. 6A illustrates a user interface view 600A of the new certificate module 208 of FIG. 3 according to an embodiment herein. The user interface view 600A of the new certificate module 208 is configured to provide an option to the one or more users 102A-N to create a new certificate. The one or more users 102A-N further select a connector type to create the new certificate. In one embodiment, the connector type includes (i) an application connector 602, (ii) a certificate authority (CA) connector 604, and (iii) a monitor connector 606. The application connector 602 provides information related to a device/application (i.e. ASNC's 112A1-N) to which the one or more certificates, and associated entities of the one or more certificates are transferred/pushed. In one embodiment, the application connector 602 includes a F5 connector for F5 device, and a script connector for ADC devices. In another embodiment, the application connector 602 includes connectors for ADC devices, and server applications/vendors. The CA connector 604 interacts with certificate authorities (CA), and facilitates a complete multi-level approval work flow in ordering/renewing/revoking the one or more certificates. The CA is an entity that provides the digital certificate. A digital certificate certifies a public key of the one or more users 102A-N for the one or more certificates which allows other users to rely upon signatures or assertions made by the private key that corresponds to the public key which is certified. The monitor connector 606 monitors an expiry status of the one or more certificates on the device at regular periods. In one embodiment, the application type includes (i) an AppViewX CA, (ii) a Script CA, and (iii) connectors that support all the CAs. In another embodiment, to create a new certificate, the one or more users 102A-N create a new key, or select the existing key that corresponds to key type and bit length.

The user interface view 600A of the new certificate module 208 further includes a certificate signing request (CSR) selection. The CSR selection includes (i) generating a new CSR, and (ii) use existing CSR. After providing the information to the CSR selection, select an add button to create a new application connector (e.g., AppViewX connector). In one embodiment, the application connector includes the details about the application CA (e.g., AppViewX CA). In another embodiment, after adding the application connector, the application connector generates a new CSR to the one or more certificates by selecting a generate CSR option (Not shown in FIG.). After generating the CSR, the CSR is approved by the application CA connector (i.e. AppViewx CA connector), by right clicking on the application CA connector, and selecting the approve CSR option. The one or more users 102A-N provide a request for a new certificate by right clicking on the application connector, and selecting a request new certificate option once the CSR is approved. In one embodiment, the connector type is a native & script connector. The native & script connector defines flexibility, and a necessary logic to the administrator to communicate with the external entities using various scripting languages.

Figure 6B:
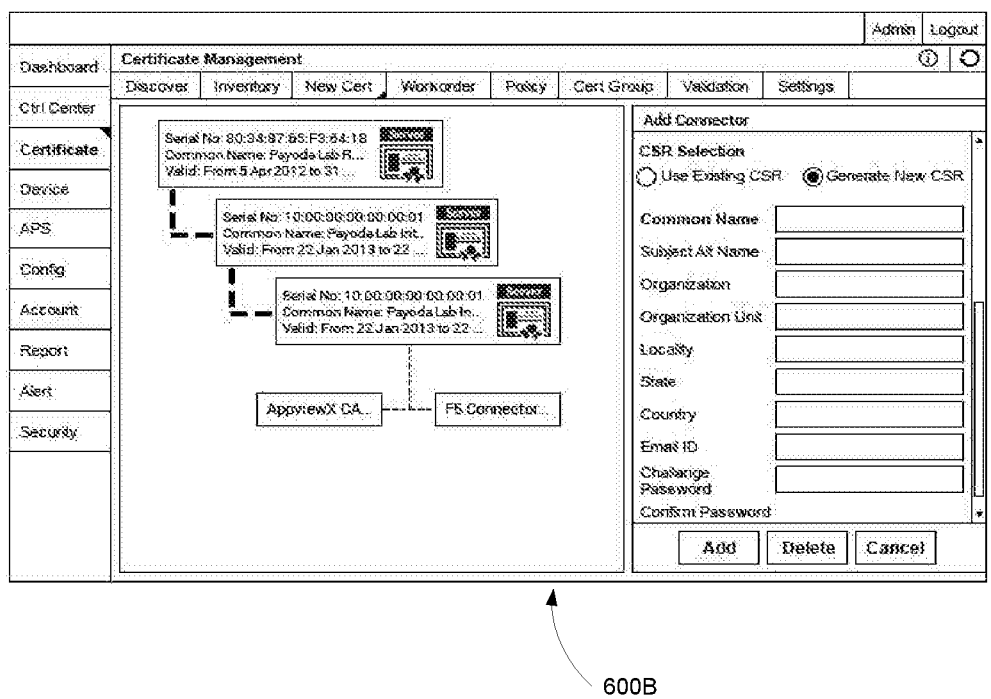
FIG. 6B illustrates a user interface view that provides a holistic view of the one or more certificates according to an embodiment herein.

FIG. 6B illustrates a holistic view of the one or more certificates according to an embodiment herein. The holistic view 600B provides the details about expiry status, technical details of the one or more certificates, associated entities (e.g., intermediate certificate, root certificates, all chain certificates, etc.) of one or more certificates, applications/device and the CA information. The holistic view is a single page where the operations/actions like validation check, order, renewal, revoke or pushing of the one or more certificates to a device are performed on granular object level. In one embodiment, the holistic view provides status of validation checks of the one or more certificates across one or more devices. In another embodiment, the application centric centralized certificate management system 106 supports various types of certificates. In another embodiment, the application centric centralized certificate management system 106 performs following operations on granular object level: (i) discovering the one or more certificates, (ii) issuing the one or more certificates, (iii) renewing the one or more certificates, (iv) pushing the one or more certificates, (v) automatic renewal/pushing the one or more certificates, and (vi) compliance reporting of the one or more certificates.

Figure 7A:
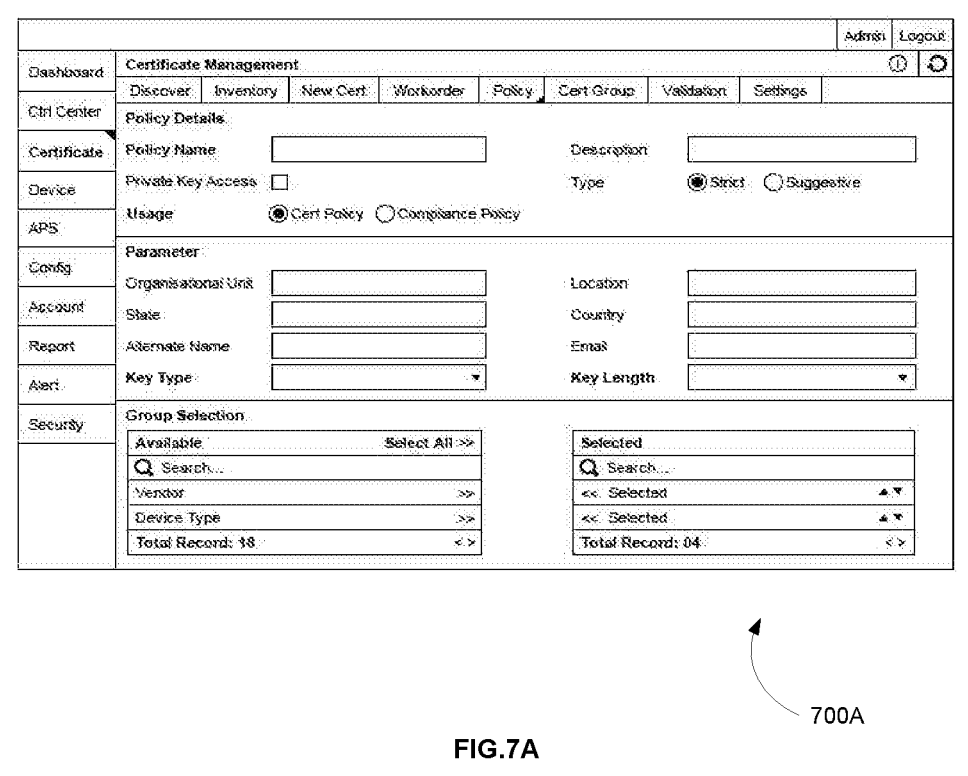

FIG. 7A illustrates a user interface view 700A of the policy module 212 of FIG. 1 according to an embodiment herein. The user interface view 700A of the policy module 212 provides an option to the one or more users 102A-N to create a policy (i.e. a set of protocols/rules) that specifies (i) usage of the one or more certificates, and (ii) practices that a certificate authority employs to manage the one or more certificates. The policy is applied on granular object level to the one or more certificates by associating the policy to certificate groups that includes common security requirements. The user interface view 700A of the policy module 212 is configured to perform a compliance check against the one or more certificates based on the policy, and generate compliance reports. The user interface view 700A of the policy module 212 further provides the details of the one or more certificates including a solution when the one or more users 102A-N lost the private keys.

Figure 7B:
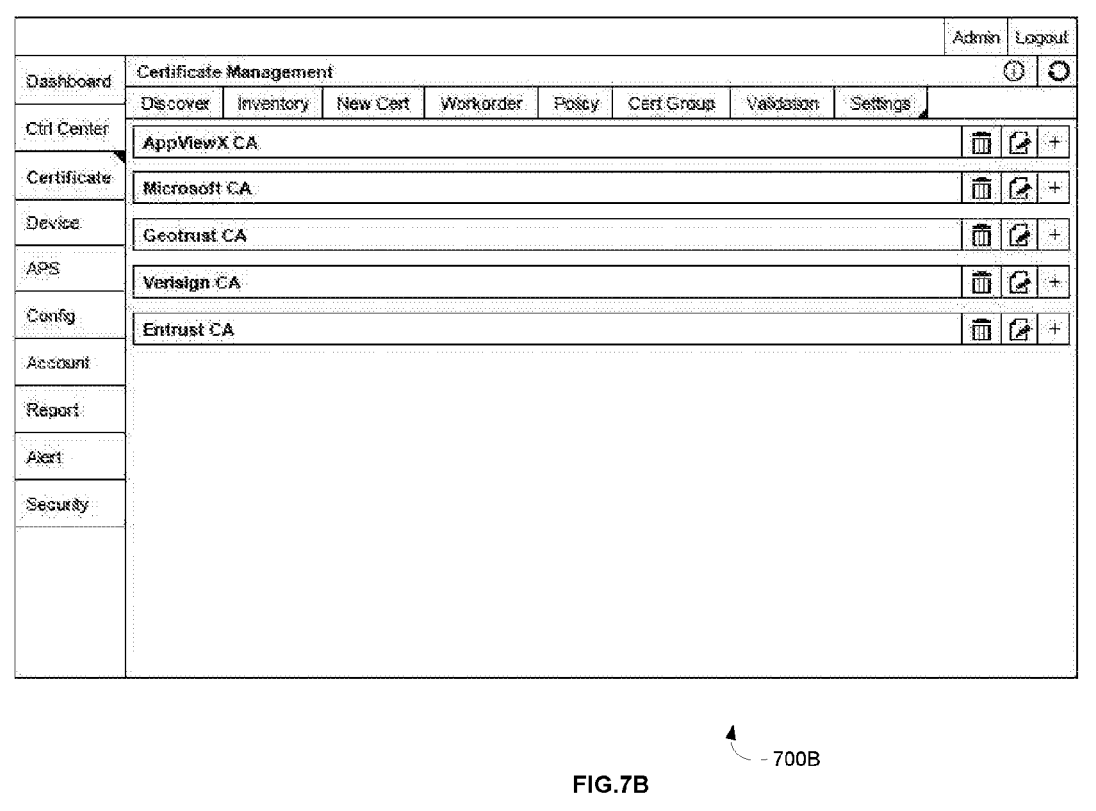

FIGS. 7B and 7C illustrate user interface views 700A-B of the settings module 218 of FIG. 3 according to an embodiment herein. The user interface views 700A-C of the settings module 218 provides an option to the one or more users 102A-N to manage authentication details to initiate a secured connection with a certificate authority (CA), when the one or more users 102A-N performs one or more actions, involving support from CA's, on the one or more certificates. In one embodiment, the user interface views 700A-C of the settings module 218 is configured to manage the certificate authorities that are connected to the application centric centralized certificate management system 106.

Figure 8:
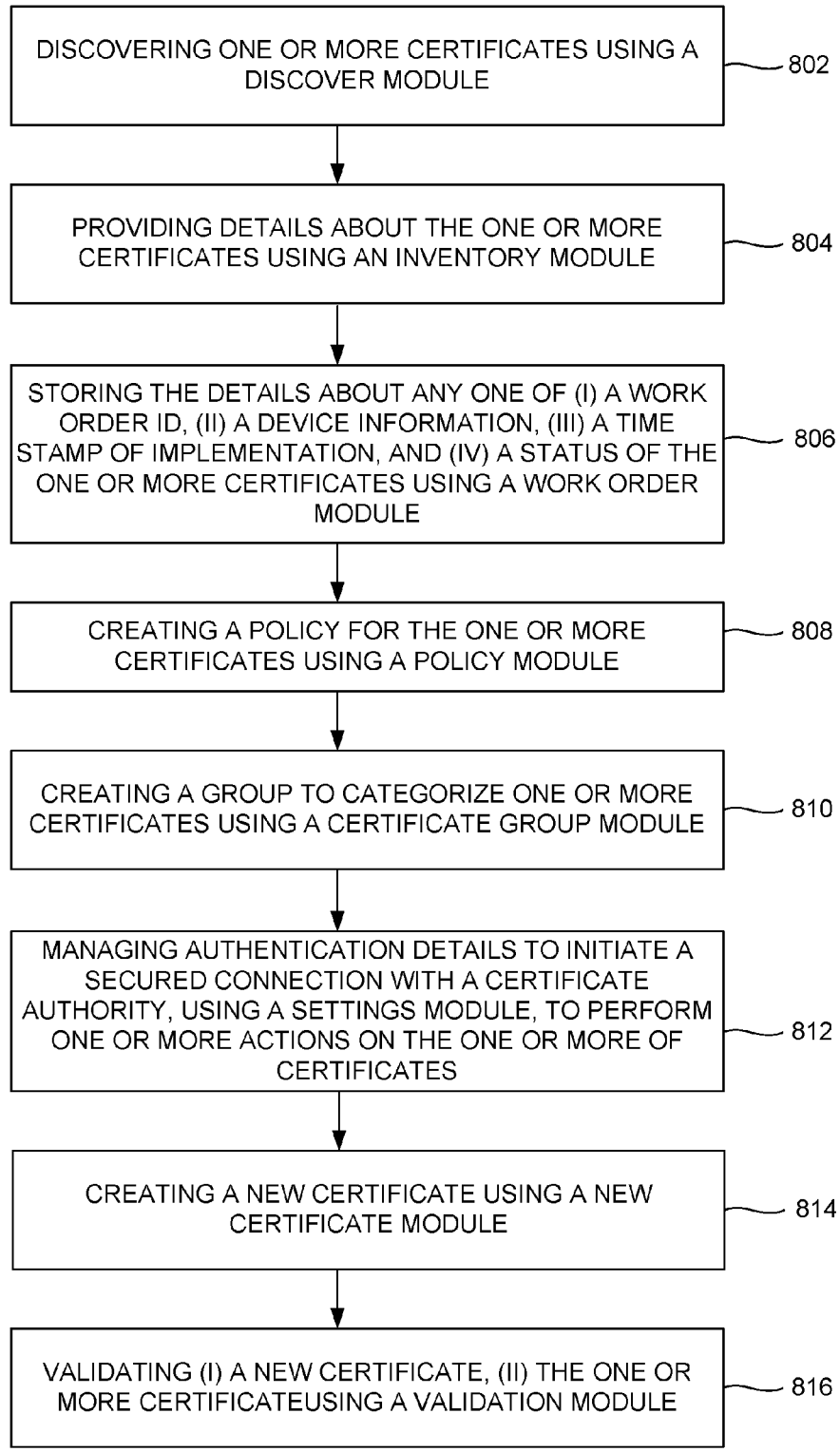
FIG. 8 is a flow diagram illustrating a computer implemented method for managing one or more certificates in one or more application specific networking components across one or more data centers according to an embodiment herein.

FIG. 8 is a flow diagram illustrating a computer implemented method for managing one or more certificates on granular object level in one or more application specific networking components across one or more data centers according to an embodiment herein. In step 802, one or more certificates are discovered in various ways using the discover module 204. In step 804, the inventory module 206 provides details of the one or more certificates, such as, a certificate group of the one or more certificates, a serial number of the one or more certificates, a profile of the one or more certificates, a vendor of the one or more certificates, and devices to which the one or more certificates are connected, and a status of the one or more certificates (e.g., managed certificate, new certificate). In step 806, the work order module 210 stores details of (i) a work order id of the one or more certificates, (ii) device information of the one or more certificates, (iii) a time stamp of implementation of the one or more certificates, and (iv) a status of the one or more certificates. In step 808, the policy module 212 creates a policy (i.e. a set of protocols/rules) that specifies (i) usage of the one or more certificates, and (ii) practices that a certificate authority (CA) employs to manage the one or more certificates. The policy is applied on granular object level to the one or more certificates by associating the policy to the certificate group that includes common security requirements. The policy module 212 performs a compliance check against the one or more certificates based on the policy, and generates compliance reports. In step 810, the certificate group module 214 creates a certificate group to group the one or more certificates. In step 812, the settings module 218 is configured to manage authentication details to initiate a secured connection with a CA to perform one or more actions on the one or more certificates. In step 814, the new certificate module 208 provides an option to create a new certificate. In step 816, the validation module 216 validates (a) the new certificate when the new certificate is added to the certificate management system 106, (b) the one or more certificates.

Figure 9:
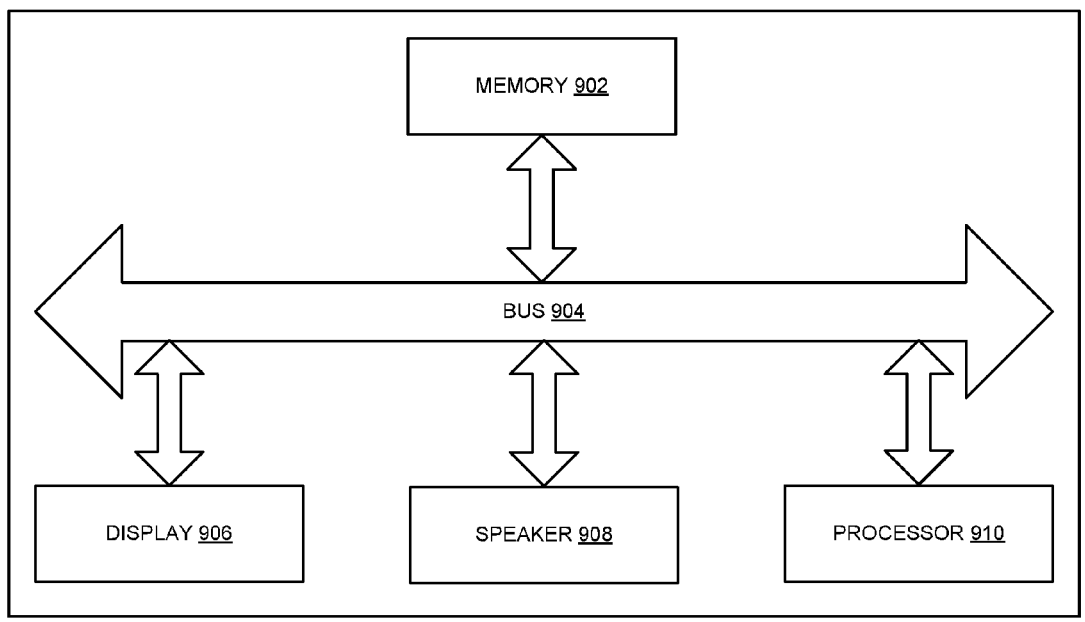
FIG. 9 illustrates an exploded view of a receiver according to an embodiment herein.

FIG. 9 illustrates an exploded view of a receiver 900 having a memory 902 having a set of instructions, a bus 904, a display 906, a speaker 908, and a processor 910 capable of processing the set of instructions to perform any one or more of the methodologies herein, according to an embodiment herein. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. The memory 902 may also store program specific information and/or service information (PSI/SI), including information about digital content (e.g., the detected information bits) available in the future or stored from the past. A user of the receiver 900 may view this stored information on display 906 and select an item of for viewing, listening, or other uses via input, which may take the form of keypad, scroll, or other input device(s) or combinations thereof. When digital content is selected, the processor 910 may pass information. The content and PSI/SI may be passed among functions within the receiver using the bus 904.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
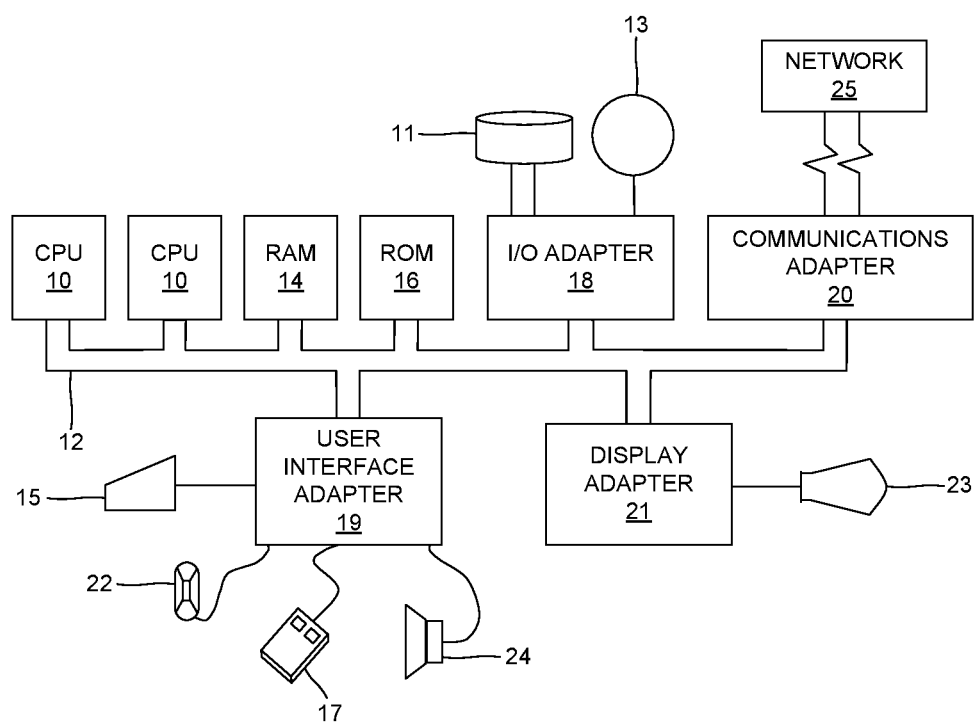
FIG. 10 illustrates a schematic diagram of a computer architecture used according to an embodiment herein.

FIG. 10 is a schematic drawing illustrates a hardware configuration of an information retrieval system/computer architecture in accordance with the embodiments herein. The computer architecture includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An application centric centralized certificate management system for managing a plurality of certificates on granular object level in a plurality of datacenters, said application centric centralized certificate management system comprising:
a memory unit that stores a database and a set of modules; and
a hardware processor that executes said set of modules, wherein said set of modules comprise:
a discover module, executed by said hardware processor, configured to discover said plurality of certificates;
an inventory module, executed by said hardware processor, configured to provide details of said plurality of certificates;
a work order module, executed by said hardware processor, configured to store details of (i) a work order id of said plurality of certificates, (ii) device information of said plurality of certificates, (iii) a time stamp of implementation of said plurality of certificates, and (iv) a status of said plurality of certificates;
a policy module, executed by said hardware processor, configured to create a policy that specifies (i) an usage of said plurality of certificates, and (ii) practices that a certificate authority (CA) employs to manage said plurality of certificates, wherein said policy module is configured to perform a compliance check against said plurality of certificates based on said policy to generate compliance reports for said plurality of certificates;
a new certificate module, executed by said hardware processor, configured to create a new certificate; and
a validation module, executed by said hardware processor, configured to validate (a) said new certificate when said new certificate is added to said application centric centralized certificate management system, and (b) said plurality of certificates; and
a display unit that displays a holistic view of said plurality of certificates to perform one or more actions on granular object level.

2. The application centric centralized certificate management system of claim 1, wherein said set of modules comprises;
a certificate group module, executed by said hardware processor, configured to create a certificate group for said plurality of certificates; and a settings module, executed by said hardware processor, configured to manage authentication details to initiate a secured connection with a certificate authority to perform one or more actions on said plurality of certificates.

3. The application centric centralized certificate management system of claim 2, wherein said inventory module is configured to provide an option to associate said plurality of certificates to said certificate group.

4. The application centric centralized certificate management system of claim 2, wherein said policy is applied to said plurality of certificates on granular object level by associating said policy to said certificate group.

5. The application centric centralized certificate management system of claim 1, wherein said discover module is configured to discover said plurality of certificates based on at least one of (i) an IP range, (ii) a subnet, (iii) an URL, (iv) by uploading a certificate, and (v) managed devices.

6. The application centric centralized certificate management system of claim 1, wherein said policy module is configured to perform at least one action on granular object level, wherein said at least one action is selected from a group comprising:
   (a) providing access control to said plurality of certificates;
   (b) a policy enforcement on said plurality of certificates; and
   (c) a compliance check on said plurality of certificates.

7. The application centric centralized certificate management system of claim 1, wherein said new certificate module is configured to provide an option to select a connector type for creating said new certificate.

8. A non-transitory program storage device readable by computer, and comprising a program of instructions executable by said computer to perform a method for managing a plurality of certificates on granular object level in a plurality of application specific networking components across a plurality of data centers, said method comprising:
   discovering a plurality of certificates in said application centric centralized certificate management system;
   providing details of said plurality of certificates;
   storing details of (i) a work order id, (ii) a device information, (iii) a time stamp of implementation, and (iv) a status of said plurality of certificates;
   creating a policy for said plurality of certificates;
   performing a compliance check against said plurality of certificates based on said policy to generate compliance reports for said plurality of certificates;
   creating a group to categorize said plurality of certificates;
   managing authentication details to initiate a secured connection with a certificate authority to perform one or more actions on said plurality of certificates;
   creating a new certificate; and
   validating (a) said new certificate when said new certificate is added to said application centric centralized certificate management system, (b) said plurality of certificates.

9. The non-transitory machine-readable medium of claim 8, wherein said method further comprises displaying a holistic view of said plurality of certificates to perform one or more actions on granular object level.

10. The non-transitory machine-readable medium of claim 8, wherein said policy is applied to said plurality of certificates on granular object level by associating said policy to said certificate group.

11. A computer implemented method for managing a plurality of certificates on granular object level in a plurality of application specific networking components across a plurality of data centers using an application centric centralized certificate management system, said method comprising:
   discovering a plurality of certificates in said application centric centralized certificate management system;
   providing details of said plurality of certificates;
   storing details of (i) a work order id, (ii) a device information, (iii) a time stamp of implementation, and (iv) a status of said plurality of certificates;
   creating a policy for said plurality of certificates;
   performing a compliance check against said plurality of certificates based on said policy to generate compliance reports for said plurality of certificates;
   creating a group to categorize said plurality of certificates;
   managing authentication details to initiate a secured connection with a certificate authority to perform one or more actions on said plurality of certificates;
   creating a new certificate; and
   validating (a) said new certificate when said new certificate is added to said application centric centralized certificate management system, (b) said plurality of certificates.

12. The computer implemented method of claim 11, further comprising displaying a holistic view of said plurality of certificates to perform one or more actions on granular object level.

13. The computer implemented method of claim 11, wherein said policy is applied to said plurality of certificates on granular object level by associating said policy to said certificate group.

* * * * *